United States Patent [19]

Ducharme et al.

[11] Patent Number: 5,064,264

[45] Date of Patent: Nov. 12, 1991

[54] PHOTOREFRACTIVE MATERIALS

[75] Inventors: Stephen P. Ducharme, Lincoln, Nebr.; William E. Moerner, San Jose, Calif.; John C. Scott, Los Gatos, Calif.; Robert J. Twieg, San Jose, Calif.

[73] Assignee: International Business Machines Corporation, Armonk, N.Y.

[21] Appl. No.: 604,560

[22] Filed: Oct. 26, 1990

[51] Int. Cl.$^5$ ................................................ G02B 1/04
[52] U.S. Cl. ...................................... 385/130; 430/59; 430/125; 385/141; 359/4
[58] Field of Search .......................... 350/96.12, 96.34; 430/59, 125

[56] References Cited

U.S. PATENT DOCUMENTS

| | | | |
|---|---|---|---|
| 2,999,826 | 9/1961 | Peerman et al. | 260/18 |
| 3,474,071 | 10/1969 | Byers et al. | 260/47 |
| 3,624,131 | 11/1971 | Becker | 260/473 G |
| 3,634,036 | 1/1972 | Fleming | 23/209.2 |
| 3,658,526 | 4/1972 | Haugh | 96/27 |
| 4,856,857 | 8/1989 | Takeuchi et al. | 350/306 |
| 4,886,339 | 12/1989 | Scozzafara et al. | 350/96.34 |
| 4,913,990 | 4/1990 | Rallison | 430/30 |
| 4,942,102 | 7/1990 | Keys et al. | 430/1 |
| 4,990,422 | 2/1991 | Staudenmayer | 430/59 |
| 4,996,124 | 2/1991 | Buettner et al. | 430/59 |

OTHER PUBLICATIONS

Addulaev et al., "Photorefractive Sensitivity of Polymer FIlms Containing Bacteriorhodapsin" Sov. Phys. Tech. Phys. (U.S.A.) vol. 58, No. 4 vol. 33, No. 4 508–10 Apr. 1988, P833–6 abstract only.

Kawatsuki et al., "Optical Phase Grating Made from Photorefractive Polymers", Appl. Opt. vol. 29, 210 01/90 abstract only.

Sugihara et al., "Noncollinear Second Harmonic Generation and Light Beam Diffraction by Transient Gratings in 2-methyl-4-nitroaniline (MNA) Crystals", SPIE vol. 1147, Nonlinear Optical Properties of Organic Materials II 1989.

Eiduss et al., "Photorefringence in Polar Crystals", Materials Science vol. XIV, No. 1, 1988.

*Primary Examiner*—John D. Lee
*Assistant Examiner*—Stephen W. Barns
*Attorney, Agent, or Firm*—Robert B. Martin

[57] ABSTRACT

The present invention relates to polymeric materials that exhibit an erasable photorefractive effect which can be fabricated into optical devices such as optical wave guides.

17 Claims, No Drawings

PHOTOREFRACTIVE MATERIALS

FIELD OF THE INVENTION

The present invention relates to polymeric materials that exhibit a reversible photorefractive effect for use in phase conjugation, hologram formation, amplification, integrated optics, spatial light modulation, optical image processing and storage, and the like.

BACKGROUND OF THE INVENTION

The photorefractive effect involves light-induced charge redistribution in a nonlinear optical material which produces local changes in the index of refraction such that dynamic, erasable holograms can be formed which diffract light. The photorefractive effect is achieved by exposing the material to an optical intensity pattern consisting of bright and dark regions, such as formed by interfering two coherent laser writing beams. Mobile charge generated in the material migrates to the appropriate region to form internal space charge electric fields which diffract the light during readout with a reading beam in accordance with the electro-optic effect Inorganic crystals exhibiting the photorefractive effect are well known in the art as described in Guenter and Huignard "Photorefractive Materials and Their Applications", Vol. I and II ("Topics in Applied Physics" Vols. 61 and 62) (Springer, Berlin, Heidelberg 1988), the disclosure of which is incorporated herein by reference. Inorganic photorefractive crystals have been fabricated into optical articles for the transmission and control (change phase, intensity, or direction of propagation) of electromagnetic radiation.

Solid State Communications Vol. 74, pages 867-870, 1990 discloses organic crystals of 2-cyclooctylamino-5-nitropyridinedoped with a minor amount of 7,7,8,8-tetracyanoquinodimethane which apparently show the photorefractive effect.

However, it is technically difficult to fabricate such crystals into desired thin layered devices such as optical wave guides. Further, it is difficult to dope organic crystalline material with dopants to achieve desired property improvements such as increase in the speed and/or magnitude of the photorefractive effect because dopants are often excluded from the crystals during growth.

Therefore, there still is a need in the art for photorefractive materials which can be readily fabricated into thin film optical devices and can be doped with sufficient amounts of suitable dopants to achieve desired property improvements.

It is therfore an object of this invention to provide a processable polymeric material exhibiting a photorefractive effect.

Other objects and advantages will become apparent from the following disclosure.

SUMMARY OF THE INVENTION

The present invention relates to an amorphous or substantially amorphous photorefractive material comprising a polymer, a non-linear optical chromophore and a charge transport agent, said material having an erasable diffraction efficiency of greater than $1 \times 10^{-8}$ and a photoconductivity greater than $1 \times 10^{-14}$ inverse-ohm-centimeter per watt per square centimeter. Photorefractivity requires that the material have a second-order non-linear optical response. Suitable second order non-linear optical coefficients ($r_{13}$ or $r_{33}$ depending on the optical polarization) are greater than about 0.01 picometer/volt. The second order non-linear optical response may be obtained by establishing polar order of the non-linear optical chromophores in the material by poling the material with an external electric field. The second-order nonlinear optical response may also be obtained from the third-order optical response of an isotropic material using an external electric field. Photorefractivity also requires a charge generator and charge traps. Defects inherent within the material will generally function as charge traps. In some cases, the non-linear optical chromophores will also function as charge generators.

The present invention also relates to optical articles for the control of electromagnetic radiation which are made from the photorefractive material of the present invention A more thorough disclosure of the present invention is presented in the detailed description which follows.

DETAILED DESCRIPTION OF THE INVENTION

The present invention relates to an amorphous or substantially amorphous erasable photorefractive material comprising a polymer, a non-linear optical chromophore ("NLO chromophore") and a charge transport agent, said material having a reversible diffraction efficiency greater than $10^{-8}$ and a photoconductivity greater than $10^{-14}$ inverse-ohm-centimeter per watt per square centimeter. The photoconductivity measurements are normalized to the intensity of light used.

One major role of the polymer of the photorefractive material of the present invention is to function as a binder. The polymer generally is transparent, film-forming, processable and soluble in organic solvents. Other desired properties will be determined by the work environment of the photorefractive material such as thermal stability, good adhesion to substrates, mechanically tough (non-brittle) and chemically stable in ambient environment. The polymer for use in the material of the present invention preferably has a molecular weight of greater than about 500 and an optical absorption coefficient at the operating wavelength of preferably less than about 10 inverse centimeters.

The nonlinear optical chromophore and the charge transport agent can be dispersed in the polymer binder (as a guest/host material) or alternatively, can be covalently bonded to the polymer in the backbone or as a pendant group. Suitable polymer/copolymers for use in the present invention include polyesters, polyamides, polyurethanes and polymers/copolymers comprising monomers having reactive functionality selected from epoxy, cyanato or maleimido. Other types of suitable polymers are polyacrylates, polystyrenes, polycarbonates, poly (vinyl carbazoles), poly(arylamines), poly (phenylene vinylenes), poly (phenylene oxides) and poly (vinyl thiazoles). Other types of suitable polymers will be known to those skilled in the art such as those polymers disclosed in U.S. Pat. Nos. 4,886,339; 4,289,842; 4,590,147; 4,497,889; 4,535,052 and U.S. Pat. No. Re. 27,925 the disclosures of which are incorporated herein by reference.

If it is desired that the photorefractive material have a permanent second order non-linear optical response, a polymer having a high glass transition temperature (Tg) will be suitable. The high Tg in a polymer is achieved by crosslinking the polymer or by using a thermoplastic polymer having a high Tg. Preferably such polymer has the non-linear optical chromophore covalently bonded to the polymer.

Such crosslinked polymers preferably comprise at least one polyfunctional monomer having, prior to its polymerization, at least one reactive functionality (preferably two or more reactive functionalities) selected from epoxy, cyanato, and maleimido which are known in the art to form crosslinked polymers having a high $T_g$. High $T_g$ generally correlates directly with the stability of induced polar order of a polymer as evidenced by a smaller decrease in loss of second-order nonlinear optical response over a longer period of time.

Such crosslinked polymers are conveniently made by placing in an electric field an oligomer comprising preferably a nonlinear optical chromophore and having the desired reactive functionalities. The oligomer is heated or exposed to light in the electric field to cause crosslinking of the oligomer. The polar order of the polymer is established in the field and after the polymer has been crosslinked, the polar order of the polymer is locked into place. Preferably, if the polymer is heated to effect temperature in the field. This process can also be performed substituting suitable monomers for the oligomer.

Suitable epoxy monomers for use in the material of the present invention include monomers having two or more epoxy

reactive functionalities. Such monomers can be polymerized to form a crosslinked homopolymer or, alternatively, copolymerized with a variety of comonomers known to those skilled in the art such as monomers having reactive functionalities including amino, hydroxy, cyanato, maleimido, carboxy, or anhydrido substituents. A preferred crosslinked polymer of the present invention is comprised of monomers having both epoxy and amino reactive functionalities and an NLO chromophore bonded to the monomer. Another preferred crosslinked polymer of the present invention is a copolymer comprised of a comonomer having at least two epoxy reactive sites and a comonomer having at least two amino reactive sites, with an NLO chromophore chemically bonded to either or both of the comonomers. Examples of monomers which can be polymerized to form the crosslinked polymers of the present invention include:

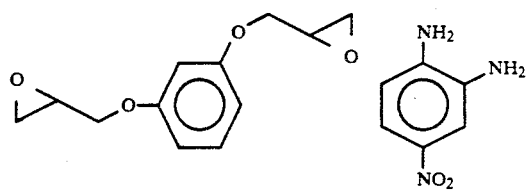

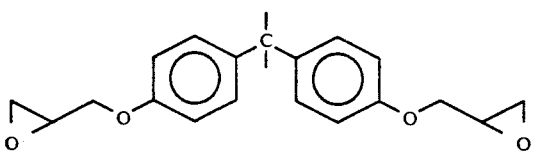

-continued

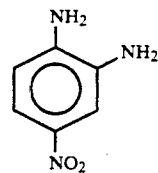

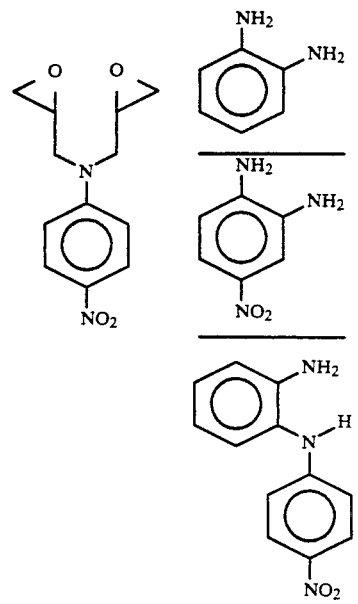

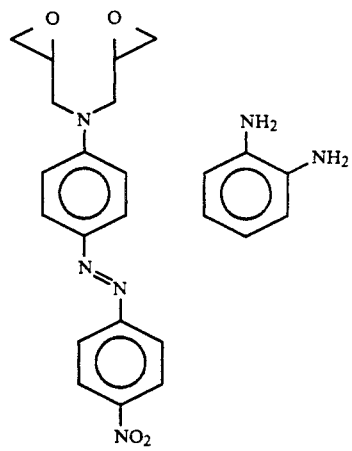

Suitable cyanato monomers for use in the materials of the present invention include monomers having two or more (NCO-) reactive functionalities. Such monomers can be polymerized to form a crosslinked homopolymer with triazine bridging groups as disclosed in Soc. Adv. Matl. Proc. Eng. Ser., Vol. 20, p. 243, 1975 or, alternatively, copolymerized with other comonomers known to those skilled in the art to have suitable reactive functionalities, such as epoxy functionalities to give oxazoline polymers, alcohol reactive functionalities to give alkylarylimidocarbonate, and maleimide reaction functionalities to give triazineimidazole. Examples of monomers which may be polymerized to form the crosslinked polymers of the present invention include:

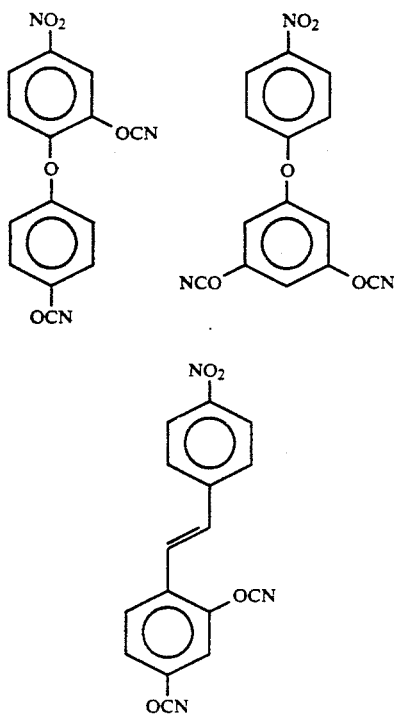
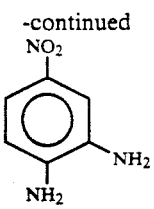
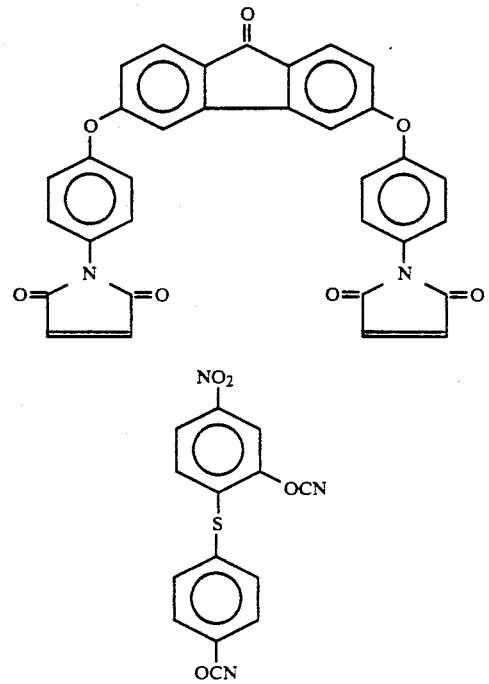

Suitable maleimido monomers for use in the materials of the present invention include monomers having the following structure:

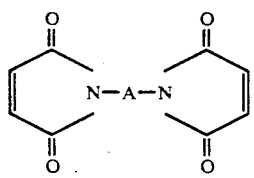

where A can be alkyl or aryl and optionally substituted with a variety of substitutes known to those skilled in the art which will not interfere with the polymerization reaction or the photorefractive effect. A is also preferably bonded to an NLO chromophore. These monomers can be generally formed by reacting maleic anhydride with an appropriate diamine. The monomers can be polymerized with comonomers having suitable reactive functionalities known to those skilled in the art as amino, alkenyl, or cyanato. Examples of such monomers which can be polymerized to form crosslinked polymers of the present invention include:

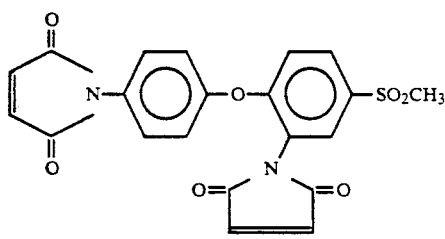

Such crosslinked polymers for use in the materials of the present invention preferably have a $T_g$ greater than about 100° C., preferably from about 150° C. to about 400° C. or more, and more preferably about 250° C. to about 350° C. The higher $T_g$ generally correlates directly with the stability of the polar order of the polymer. Polymers with higher $T_g$ show smaller decrease in the second-order nonlinear optical response over longer period of time.

The nonlinear optical chromophores for the materials of the present invention have unsymmetrical, polarized, conjugated π electrons between a donor and acceptor group. Examples of NLO chromophores are as follows:

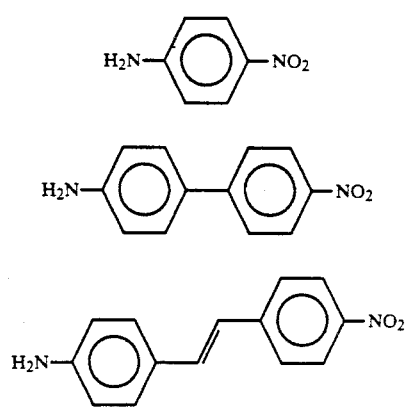

-continued

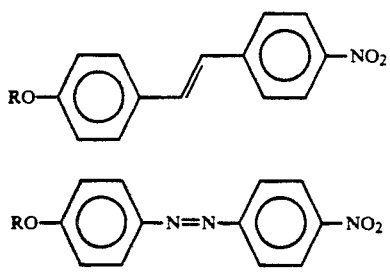

Other suitable chromophores for use in the present invention will be known to those skilled in the art such as those disclosed in "Nonlinear Optical Properties of Organic Molecules and Crystals" by Chemla and Zyss, Academic Press, 1987, the disclosure of which is incorporated herein by reference. The material of the present invention comprises about 10 weight % to about 90 weight % of the NLO chromophore, preferably greater than about 20 weight %. The NLO chromophore provides the photorefractive material with the requisite second order non-linear optical response.

Photorefractivity also requires the generation of a mobile charge. The generation of a mobile charge may be accomplished by light absorption in a suitable chromophore and subsequent separation of an electron-hole pair. In some cases, the NLO chromophore can also function to generate the mobile charge which migrates during the photorefractive effect. However, the photorefractive materials of the present invention may optionally be doped with charge generating agents if the NLO chromophore does not function as a charge generator or if it is desired, to enhance the response at a desired wavelength.

The charge generating agent can be dispersed in the polymer binder or bonded to the polymer or the NLO chromophore. Suitable charge generating agents are bis-azo and tris-azo dyes or pigments, squarylium dyes or pigments as disclosed in U.S. Pat. No. 3,824,099; phthalocyanine pigments as disclosed in U.S. Pat. No. 3,898,084; perylene dyes or pigments as disclosed in U.S. Pat. Nos. 4,431,721 and 4,587,189; perylium salts as disclosed in U. S. Pat. No. 4,108,657 or cyanine or methine dyes. Other types of charge generating agents will be known to those skilled in the art.

The charge generating agent may absorb light at longer wavelength than the NLO chromophore and it will have an oxidation potential larger than the charge transport agent (for hole conduction) or a reduction potential larger than the charge transport agent (for electron conduction). The material preferably comprises about 0 to about 15 weight % of the charge generating agent. The photorefractive material of the present invention will have an optical absorption coefficient of about 0.1 to about 10, preferably less than about 3 inverse centimeters.

The charge transport agent for the material of the present invention may be one of two general types: a hole transport agent, or an electron transport agent. The charge transport agent in combination with the charge generating agent provides the photorefractive material with requisite photoconductivity of greater than about $10^{-14}$ inverse-ohm centimeter per watt per square centimeter. Hole transport agents may be characterized as having excess electron density in the neutral state such that oxidation to the cation radical occurs easily. The material of the present invention comprises about 10 weight % to about 80 weight % of the hole transport agent, preferably at least about 20 weight % so that the hole may travel easily by hopping or migrating from molecule to molecule. Examples of classes of hole transport agents are as follows:

hydrazones such as aldehyde-N-diphenyl hydrazones e.g. p-diethylaminobenzaldehyde diphenylhydrazone
carbazoles such as

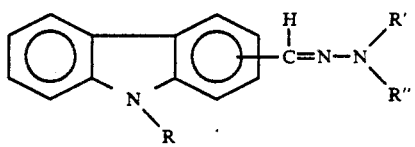

wherein R is alkyl and R' and R" are alkyl or aryl
amino-substituted aryl methanes such as

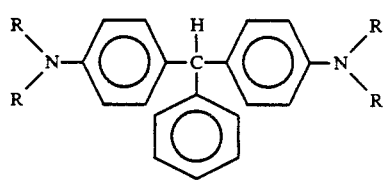

where R is alkyl or aryl
aryl amines

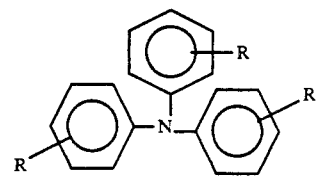

wherein R is alkyl
pyrazolines

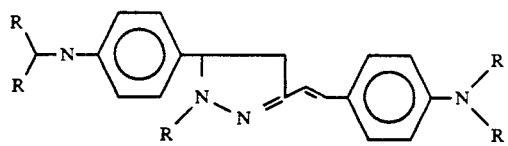

wherein R is alkyl or aryl
oxazoles

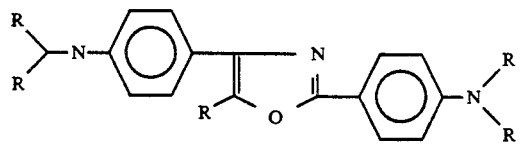

where R is alkyl or aryl
oxadiazoles

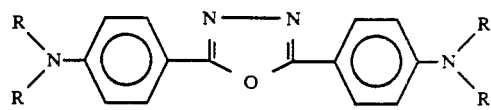

where R is alkyl or aryl
amino-substituted stilbenes

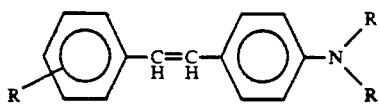

where R is alkyl or aryl

An electron transport agent may be characterized as having a deficiency of electron density such that in the reduced state electrons may migrate from molecule to molecule. The material of the present invention comprises about 10 weight % to about 80 weight % of the electron transport agent, preferably greater than about 20 weight %. Examples of electron transport agents are nitro-substituted fluorenones such as: 2,7 dinitrofluorenone, 2,4,7 trinitrofluorenones, 2,4,5,7 tetranitrofluorenone and 2 carboalkoxy - 4,5,7-trinitro fluorenone.

Other suitable charge transport agents for use in the present invention will be known to those skilled in the art such as those disclosed in "Electronic Properties of Polymers", Chapter 6, Mort, and Pfister, (Wiley, 1982), the disclosure of which is incorporated herein by reference. The charge transport agent can be dispersed in the polymer binder or alternative covalently bonded to the polymer to form a photoconductive polymer such as

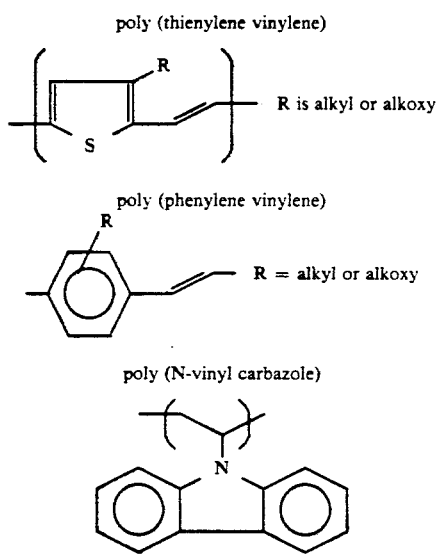

poly (thienylene vinylene)

R is alkyl or alkoxy poly (phenylene vinylene)

R = alkyl or alkoxy poly (N-vinyl carbazole)

The photorefractive effect depends on the action of an internal electric field produced by trapped space charge. Generally, defects such as microvoids, chain ends and conformational variations in the amorphous material will function as charge traps for migrating charge. Space charge trapping can optionally be enhanced if necessary or desired, at the expense of reduced photoconductivity, by incorporation of charge trapping agents into the material. For example, when the charge transport agent is an electron donor (hole transport agent), charge traps can be provided by incorporating into the material a molecule having a lower oxidation potential than the charge transport agent. For example, if p-diethylaminobenzaldehyde diphenyl hydrazone (0.58 volts oxidation potential) is utilized as a charge transfer agent, the material could be doped with diethylaminobenzaldehyde methylphenylhydrazones (0.53 volts oxidation potential) or 1-phenyl-3-diethylaminostyryl-5-(diethylamino) hydrazone (0.51 volts oxidation potential).

When the charge transport agent is an electron acceptor, (electron transport agent) charge traps can be molecules having a lower reduction potential than that of the charge transport agent. For example, if the charge transport agent is trinitrofluorenone, tetranitrofluorenone, can be the charge trap. The concentration of the charge trapping agent in the material is about 0 to 10 weight %.

The amorphous or substantially amorphous material of the present invention is generally non-crystalline such that it will not substantially scatter incident light. The material is comprised of components which may be crystalline prior to forming the material. However, the term "amorphous" as used herein is intended to include materials which are completely amorphous, materials which have therein dispersed areas of crystallization insufficient to cause substantial scattering of light and also materials which have microcrystals smaller than the wavelength of incident light (e.g. 350 to 700mm.)

The material of this invention has a second order optical nonlinearity for the electro-optic effect which can be detected using a Mach-Zehnder interferometer. The interferometer splits a polarized coherent laser beam into two beams of equal intensity; one is passed through the material with transparent electrodes at non-normal incidence and then is mixed with the other beam. When a voltage is imposed across the film in the 3-direction (normal to the plane of the material) a phase shift occurs which is analyzed for the second order non-linear optic coefficients $r_{13}$ and $r_{33}$ (where the subscript 13 denotes 1-direction for optical polarization of incident light and the 3-direction for the applied electric field).

The photoconductivity of the photorefractive materials of this invention may be determined by applying a voltage across the material and measuring with an ammeter the additional current that results when the material is illuminated. For example, with the 3-direction being normal to the plane of the material, the voltage may be applied along the 3-direction and current flowing in the 3-direction is measured.

To distinguish the materials of the present invention as being photorefractive rather than photochromic, photorefractivity may be determined in any one of three tests depending upon the relative importance of carrier diffusion and external-field-induced drift in the charge transport process. A positive result on any one of these three tests determines that the material exhibits the photorefractive effect. In all cases the diffraction must be anisotropic consistent with the symmetry of the electro-optic coefficients for various polarizations.

(1) Reversible anistropic holographic grating formation with the phase shift between the light intensity pattern and the index of refraction pattern not equal to zero degrees indicates the photorefractive effect in which diffusion dominates over drift in the charge transport process. For example, two coherent beams are overlapped in the material to form a grating. One beam is then attenuated, and the optical phase shift between the transmitted weak beam and the diffracted beam from the remaining strong beam is measured by standard interferometric techniques; or (2) The presence of anistropic asymmetric two-beam coupling indicates the photorefractive effect in which diffusion dominates over drift. The asymmetric two-beam coupling can be observed when two coherent beams are overlapped in the material and the optical power of in the two transmitted beams is measured by art known techniques. Asymmetric two-beam coupling occurs if the optical power of one of the two beams decreases while the optical power in the other beam increases during grating formation; or (3) If drift dominates over diffusion in the charge transport process, then the presence of the photorefractive effect can be determined by the formation of an erasable holographic anisotropic diffraction grating only when an external DC electric field is applied to the material during grating formation.

The reversibility or erasability of the photorefractive effect of the material of the present invention is exhibited when the material is illuminated with two coherent writing light beams in the presence of an electric field for a period of time equal to the product of ten, the dielectric constant, and the permittivity of free space all divided by the photoconductivity. After removal of one of the light beams, a diffracted beam will appear traveling in the same direction as the beam that was removed as a result of photorefractive hologram formation. The photorefractive hologram can then be erased by applying only one writing beam of the same wavelength for a sufficient period of time.

The materials of the present invention can be fabricated into optical articles for the transmission and control (change phase, intensity, or direction of propagation) of electromagnetic radiation by art-known techniques. The materials of the present inventions can be formed into thin films by casting or by spin coating. Patterned channel waveguides can be produced with the thin films using standard techniques of lithography or direct laser writing to make waveguide photorefractive devices, such as phase conjugators, mirrors, amplifiers, spatial light modulators, optical processors, or holographic optical storage devices. The methods for making such optical devices are known to those skilled in the art as disclosed in the Gunters reference set forth above.

The following examples are detailed descriptions of methods of preparation of certain materials of the present invention. The detailed preparations fall within the scope of, and serve to exemplify, the more generally described methods of preparation set forth above. The examples are presented for illustrative purposes only, and are not intended as a restriction on the scope of the invention. All temperatures are in degrees celsius.

SYNTHESIS OF POLYMER

EXAMPLE 1

Polymer prepared from epoxy reaction of bisphenol A diglycidylether and 4-nitro-1,2-phenylenediamine and subsequently mixed with diethylamino-benzaldehyde-diphenyl hydrazone(DEH): (Bis-A-NPDA/DEH):

Step 1

In a 100 ml round bottom flask with stirbar and nitrogen inlet was placed bisphenol A diglycidylether (12.0 g, 35.3 mmol, 70.6 mmol active sites) and freshly recrystallized 4-nitro-1,2-phenylenediamine (3.0 g, 19.5 mmol, 77.85 mmol active sites). The resulting mixture was heated and stirred in a 150° oil bath for 35 minutes. The resulting low molecular weight polymer, obtained as a dark glassy solid, had the following properties: Tg 65°; number average molecular weight (Mn) 2200; weight average molecular weight (Mw) 6900 index of refraction =1.62.

Step 2

200 mg of the prepolymer from Step 1 was added to 8 ml of propylene glycol monomethyl ether acetate and stirred for 1-2 days. 86.4 mg of the transport agent DEH was added to the mixture to yield a weight fraction of solids of 30%. The dissolved mixture was filtered with a 0.2 micron filter to remove insoluble material, and utilized to prepare samples. In a typical sample preparation, 1.5 ml of the mixture was slowly dripped over a time of 30 minutes onto two transparent conducting ITO glass slides maintained at 95 degree C on a hot plate. After this partial drying procedure, the two glass slides with spacers were pressed together and quenched to room temperature on a metal plate. The resulting samples ranged in thickness from 175 to 500 microns and showed weak optical density gradients which is believed likely due to partial crosslinking.

EXAMPLE 2

Polymer prepared from epoxy reaction of bisphenol A diglycidylether and 4-nitro-1,2-phenylenediamine and subsequently mixed with diethylamino-benzaldehydenaphthylpheny hydrazone(NDEH): (Bis-A-NPDA/NDEH):

Preparation same as Example 1 above, except that the hole transport agent used is NDEH.

EXAMPLE 3

Polymer prepared from epoxy reaction of bisphenol A diglycidylether and 4-nitro-1,2-phenylenediamine and subsequently mixed with diethylamino-benzaldehyde-N-amino carbazole hydrazone(DECH): (Bis-A-NPDA/DECH):

Preparation same as Example 1 above, except that the hole transport agent used is DECH.

EXAMPLE 4

Polymer prepared from N,N-diglycidyl-4-nitroaniline and N-(2-aminophenyl)-4-nitroaniline and containing diethylamino-benzaldehyde-diphenyl-hydrazone (NA-APNA/DEH):

Step 1

In a 1000 ml round-bottom flask with stirbar, reflux condenser, and nitrogen inlet was placed 4-bromoaniline (86 g, 500 mmol), epichlorohydrin (184 g, 2000 mmol), and water (0.5 ml). The resulting solution was gradually warmed to 130° in an oil bath and kept at that temperature for 150 minutes, after which time only a trace of mono adduct was evident by thin-layer chromatography analysis. The reaction mixture was cooled and excess epichlorohydrin was stripped off by rotary evaporation, toluene (100 ml) was added, and stripped off again. Then toluene (100 ml) was added to the stirred solution along with some seed crystals and methylcyclohexane (100 ml) (added dropwise with stirring). After stirring overnight, the suspension was chilled in an ice bath and filtered, washed with a cold 1:1 mixture of toluene and methylcyclohexane, and air dried to give the product as a grey powder (101 g, 56%), mp 100°-112° C. This material was of adequate purity for the subsequent nitration reaction.

Step 2

In a 1000 ml round-bottom flask with stirbar was placed N,N-(2,2'-dihydroxy-3,3'-dichloropropyl)-4-bromoaniline (35.7 g, 100 mmol) and glacial acetic acid (263 ml). To this stirred solution was added over about two hours 160 ml of an aqueous solution of sodium nitrite (55.2 g, 800 mmol). After an additional one hour of stirring, thin-layer chromatography indicated the absence of a bromo starting material and the reaction mixture was transferred to a separatory funnel with ethyl acetate (500 ml) and water (500 ml). The phases were separated and the organic phase was washed with water (200 ml, 2X) and then saturated sodium bicarbonate solution until gas evolution ceased. The organic phase was dried over magnesium sulfate, filtered through a pad of silica gel, and concentrated to a red oil which was dissolved in toluene and stripped down again. Then more toluene (200 ml) was added and the crude mixture stirred at room temperature, and the resulting crystalline slurry was stirred at room temperature for 24 hours. The solid was isolated by suction filtration and washed with a cold mixture of toluene and methylcyclohexane to give the 16.4 g of crude product. This material was then recrystallized from a minimal amount of hot toluene to give the desired product in adequate purity for subsequent reaction (12.5 g, 38%), mp 109°–114° C.

Step 3

In a 1000 ml round-bottom flask with stirbar, addition funnel, and nitrogen inlet was placed N,N-(2,2'-dihydroxy- 3,3'-dichloropropyl)-4-nitroaniline (12.93 g, 40 mmol), toluene (180 ml), and then 45% aqueous KOH (52 g) was added dropwise over 30 minutes. The resulting two-phase system was stirred for 24 hours at which time thin-layer chromatography indicated the reaction was complete. The mixture was transferred to a separatory funnel with ethyl acetate (500 ml) and water (200 ml). The phases were separated and the organic phase was washed with water (100 ml, 2X), then dried over magnesium sulfate and filtered through a pad of silica gel. Concentration of the filtrate gave a yellow solid which was dried in a vacuum oven to give the crude product (10.0 g, 100%). This material was recrystallized from a minimal amount of hot methanol to give the pure product as yellow needles (8.2 g, 82%), mp 96°–97°: nmr CDCl3δ8.09 (d, 2H), 6.75 (d, 2H), 3.88 (dd, 2H), 3.50 (dd, 2H), 3.16 (m, 2H), 2.80 (t, 2H), 2.54 (q, 2H).

Step 4

In a 500 ml round-bottom flask with stirbar, condenser, and nitrogen inlet was placed 1,2-phenylenediamine (10.8 g, 100 mmol), N-methylmorpholine (25.5 g, 250 mmol), 4-fluoronitrobenzene (28.2 g, 200 mmol), and anhydrous DMSO (125 ml). The solution was brought to a gentle boil (bath temperature 170°–180°). After 14 hours, the 1,2-phenylenediamine was consumed and the solution was cooled and brought up to 500 ml with water. This solution was transferred to a separatory funnel with ethyl acetate (300 ml) and water (200 ml). The phases were separated and the organic phase was washed with water (250 ml, 4X), brine (250 ml), and then dried over magnesium sulfate and filtered through a pad of silica gel. Silica gel was added to the filtrate and concentrated to dryness. This material was placed at the top of a column and eluted with a gradient of ethyl acetate in hexane. The appropriate fractions were combined, concentrated, and the resulting orange solid was recrystallized from toluene to give 12.22 g (53%) of desired product, mp 142°–145°: nmr (CDCl3δ8.06 (d, 2H), 7.08–7.12 (m, 2H), 6.70–6.80 (m, 2H), 6.62 (d, 2H), 5.78 (br s, 1H), 3.76 (br s, 2H).

Step 5

In a 25 ml round-bottom flask with stirbar and nitrogen inlet was placed N,N-diglycidyl-4-nitroaniline (1.1 g, 4.4 mmol, 8.8 mmol active sites) and N-(2-aminophenyl)-4nitroaniline (0.67 g, 2.9 mmol, 8.7 mmol active sites). This mixture was stirred and heated at the following schedule: 140° for 3 minutes, 120° for 45 minutes, and finally 130° for 20 minutes. After cooling, the prepolymer was obtained as a dark glass with the following properties:

$T_g 5°$; $M_n$ 700; $M_w$ 1000; $UV_{max}$ 397 nm index of refraction 1.72.

Step 6

Using the prepolymer from Step 5, samples were prepared containing 25 wt % DEH using the techniques described under Example 1, Step 2.

MEASUREMENT OF PROPERTIES

Photoconductivity

Light-induced increases in the conductivity of the samples were measured at zero frequency using a voltage source, a picoammeter and a tunable laser. Conductivity increases of greater than $1 \times 10^{-14}$ inverse-ohm-cm were observed per watt per square centimeter of incident light intensity. The measurements for several samples of each of Examples 1–4 are as follows:

| Example | Photoconductivity ($10^{-12}$ inverse-ohm-cm/watt/cm$^2$) |
| --- | --- |
| 1 | 0.06–12.0* |
| 2 | 0.02–0.7* |
| 3 | 0.33 |
| 4 | 0.2–2.8* |

*several samples measured.

Second-order Nonlinearity

Samples were studied in a Mach-Zehnder interferometer to obtain a value for the electro-optic coefficient. Since the samples were not fully cross-linked, samples could be poled in an electric field in a nearly reversible fashion at room temperature. The value of electro-optic coefficient rose linearly with applied electric field, reaching a of maximum in the range of 0.02 to 4.0 picometers/volt at an applied field of 120 kV/cm. The range of measurements for several samples of each of Examples 1–4 are as follows:

| Example | Electro-optic Coefficient [$pm/V$] |
| --- | --- |
| 1 | 0.02–1.2* |
| 2 | 0.05–0.24* |
| 3 | 0.035–0.28* |
| 4 | 0.33–4.0* |

*several samples measured.

Photorefractive Diffraction Efficiency

Using a four-wave mixing geometry known in the art, two mutually coherent interfering writing beams overlapping at angles between 1 and 85° (typically 30°) at a wavelength of 647 nm were used to write a phase hologram in the material. A third reading beam was used to produce a diffracted beam from the grating. A reading beam was sent through the material in a direction opposite (counterpropagating) one of the writing beams, designated beam B. The resulting diffracted beam appeared in a direction opposite (counterpropagating) to that of writing beam C and may be measured as a reflection from a beam splitter placed in beam C. Diffraction efficiencies are measured by recording the ratio between the power in the diffracted beam and the power in the transmitted reading beam. The range of measurements for several samples of each of examples 1–4 are as follows:

| Example | Diffraction Efficiency | |
|---|---|---|
| 1 | $5 \times 10^{-7}$–$5 \times 10^{-5}$ | (at 125 kv/cm)* |
| 2 | $4 \times 10^{-6}$–$10 \times 10^{-6}$ | (at 110 kv/cm)* |
| 3 | $9 \times 10^{-6}$ | (at 110 kv/cm) |
| 4 | $1.2 \times 10^{-5}$–$1 \times 10^{-3}$ | (at 85 kv/cm)* |

*several samples measured.

The sample could only be read out with an external electric field applied to establish the nonlinearity. The gratings showed anisotropic diffraction as required by the large ratio between the electro-optic coefficients $r_{33}/r_{31}$. Each sample exhibited photo refractivity as defined by test #3 as previously described. The gratings could be erased with either of the writing beams alone, optionally with an electric field applied of substantially the same magnitude as required for grating formation. After it has been erased, the material is prepared to accept the formation of a new grating pattern.

Although this invention has been described with respect to specific embodiments, the details thereof are not to be construed as limitations for it will be apparent that various embodiments, changes, and modifications may be resorted to without departing from the spirit and scope thereof, and it is understood that such equivalent embodiments are intended to be included within the scope of this invention.

We claim:

1. An amorphous photorefractive material comprising a polymer, a non-linear optical chromophore and a charge transport agent, said material having a diffraction efficiency greater than $10^{-8}$ and a photoconductivity greater than $10^{-14}$ inverse-ohm-centimeter per watt per square centimeter.

2. The material of claim 1 wherein said material comprises at least about 20% by weight of said charge transport agent.

3. The material of claim 2 wherein said polymer is polyester, polyamide, polyurethane or a polymer comprising one or more epoxy, cyanato and maleimido monomers.

4. The material of claim 3 wherein said polymer is crosslinked.

5. The material of claim 3 wherein said charge transport agent is an aryl amine, carbazole or a hydrazone.

6. The material of claim 3 wherein said non-linear optical chromophore is covalently bonded to said polymer.

7. The material of claim 2 wherein said material further comprises a charge generating agent.

8. The material of claim 2 wherein said material further comprises a charge trapping agent.

9. An optical article for the transmission of electromagnetic radiation comprising an amorphous photorefractive material comprising a polymer, a non-linear optical chromophore and a charge transport agent, said material having a defraction efficiency greater than $10^{-8}$ and a photoconductivity greater than $10^{-14}$ inverse-ohm-centimeter per watt per square centimeter.

10. The article of claim 9 wherein the material comprises at about least 20% by weight of said charge transport agent.

11. The article of claim 10 wherein said polymer is polyester, polyamide, polyurethane or a polymer comprising one or more epoxy, cyanato and maleimido monomers.

12. The article of claim 11 wherein said polymer is crosslinked.

13. The article of claim 11 wherein said charge transport agent is an aryl amine, a carbazole or, a hydrazone.

14. The article of claim 11 wherein said non-linear optical chromophore is covalently bonded to said polymer.

15. The article of claim 10 wherein said material further comprises a charge generating agent.

16. The article of claim 10 wherein said material further comprises a charge trapping agent.

17. The article of claim 10 wherein said article is an optical wave guide.

* * * * *